Dec. 9, 1958 F. R. MORTIMER 2,863,322
MOUNTING FOR A WHEEL DRIVEN ROTARY INERTIA DEVICE
Filed July 16, 1956 2 Sheets-Sheet 1
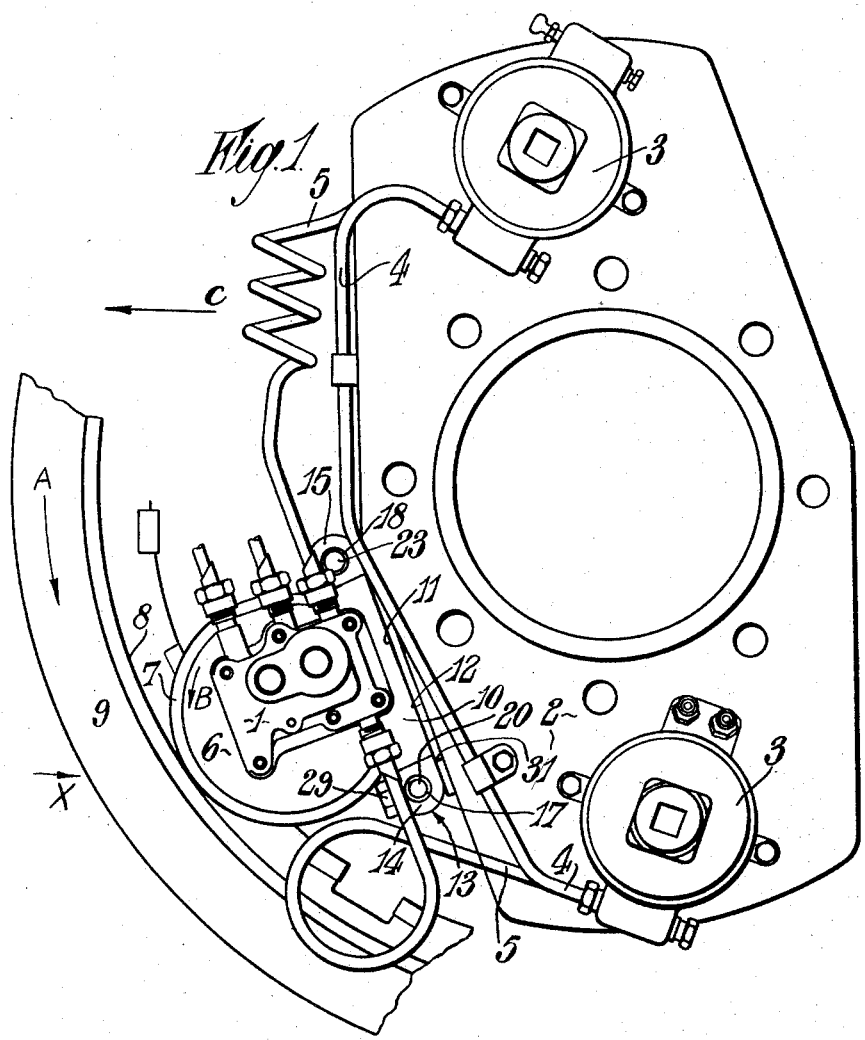
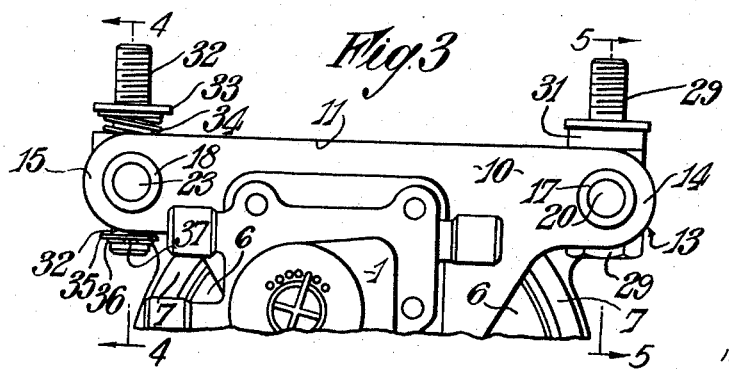
INVENTOR
Frank Radcliffe Mortimer
by Benj. T. Cauder
his attorney Dec. 9, 1958 F. R. MORTIMER 2,863,322
MOUNTING FOR A WHEEL DRIVEN ROTARY INERTIA DEVICE
Filed July 16, 1956 2 Sheets-Sheet 2
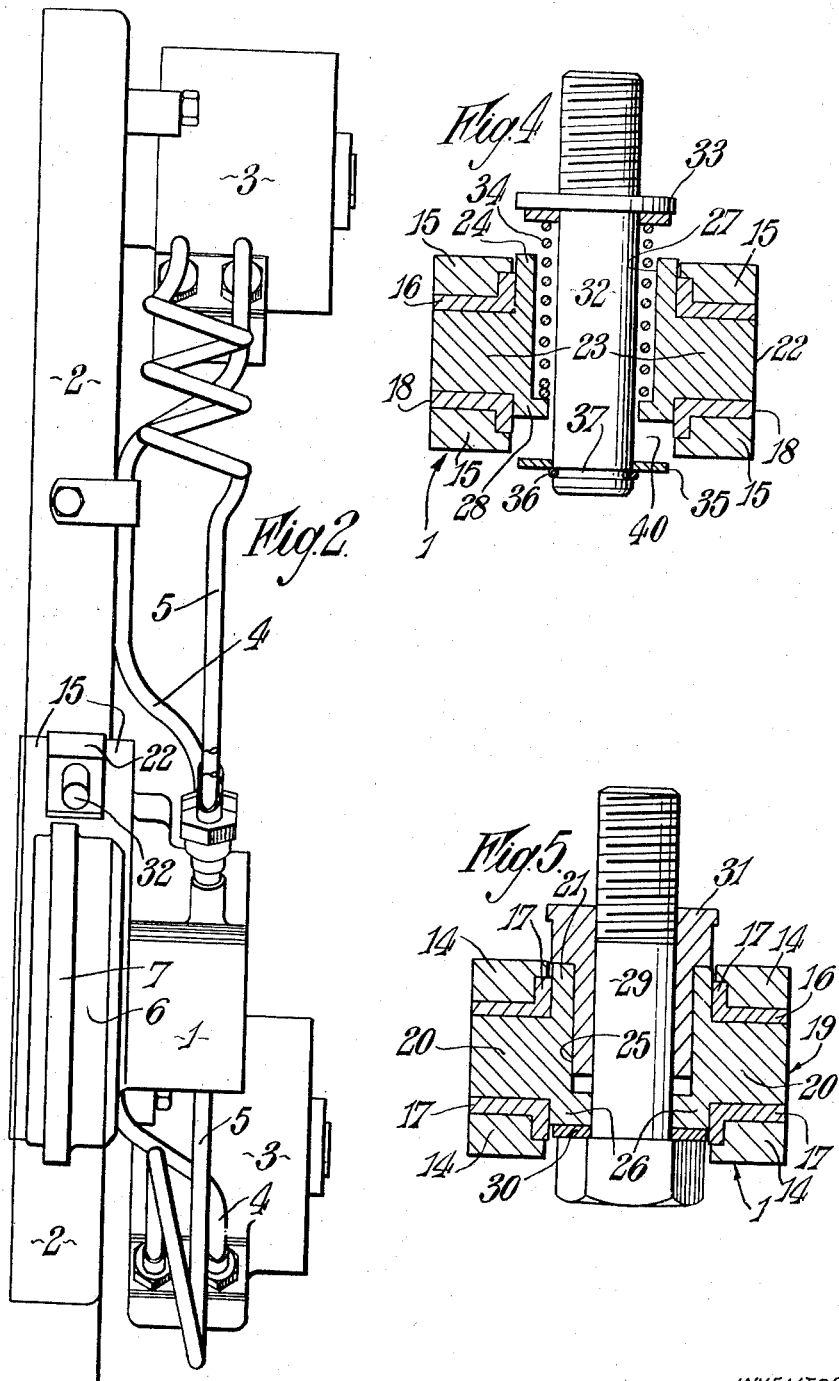

United States Patent Office 2,863,322
Patented Dec. 9, 1958

2,863,322

MOUNTING FOR A WHEEL DRIVEN ROTARY INERTIA DEVICE

Frank Radcliffe Mortimer, Styvechale, Coventry, England, assignor to Dunlop Rubber Company Limited, London County, England, a British company Application July 16, 1956, Serial No. 598,113

Claims priority, application Great Britain July 28, 1955

6 Claims. (Cl. 74—209)

This invention relates to rotary inertia devices and fluid braking systems and more particularly relates to rotary inertia devices which are driven by aircraft or vehicle wheels to control the flow of pressure fluid from a source of fluid pressure-operated brakes associated with said wheels so as to prevent locking of the wheels and consequent skidding or sliding of the wheels on their supporting surface, and to fluid braking systems wherein such devices are incorporated.

Rotary inertia devices of the type comprising a rotatable housing driven by an aircraft wheel are known. Such a device is described and illustrated in Patent No. 2,656,017, October 20, 1953 in which the rotatable housing is provided on its outer periphery with a solid rubber tyre which is in frictional engagement with the inner periphery of the aircraft wheel. The housing is thus driven by the wheel with little or no slip, and this makes the device more responsive to sudden accelerations and decelerations of the wheel.

In order to ensure the correct amount of frictional interference between the housing tyre and wheel it has been found necessary to insert shims between the device and the member to which it is secured, and additional shims are inserted from time to time to compensate for wear of the housing tyre.

The object of the present invention is to provide means whereby the housing of a rotary inertia device is urged against the wheel with a force which is substantially constant, irrespective of wear of the housing tyre, so that the necessity for the use of shims is avoided.

According to the present invention a rotary inertia device comprises a rotatable housing having a peripheral tyre and spring means to force the tyre of said housing into frictional engagement with a wheel or like rotatable member.

Preferably the housing is mounted in bearings in a casing having a base which is adapted to be secured to a non-rotatable portion of the brake, e. g. a torque plate. The base of said casing is secured, by nut and bolt devices associated with each end thereof, to the torque plate. One end of the base is pivotally mounted and the mounting at the opposite end incorporates a spring which forces the tyre on the rotatable housing into frictional engagement with the rim of the aircraft wheel with a predetermined force.

Also according to the invention an assembly of a wheel, a wheel brake and a rotary inertia device, comprises a rotary inertia device comprising a rotatable housing having a peripheral tyre and spring means to force the tyre of said housing into frictional engagement with a rotatable portion of said wheel, a non-rotatable portion of said rotary inertia device being resiliently secured to a non-rotatable portion of said wheel brake.

The invention will now be described in association with a rotary inertia device of the kind described and illustrated in Patent No. 2,656,017, and with reference to the accompanying drawings, of which:

Figure 1 is a side elevation of the device showing associated portions of a wheel, torque plate and brake assembly, Figure 2 is a side elevation of Figure 1 in the direction of arrow X, the wheel rim being omitted, Figure 3 is an enlarged view of a portion of the casing of the rotary inertia device showing the arrangement of the spring means and the pivot means, and Figures 4 and 5 are sections on the lines 4—4 and 5—5, respectively, of Figure 3.

In this form of the invention a rotary inertia device 1 (Figure 1) is associated with the non-rotatable torque plate 2 of a brake mechanism of known type, the several valves of the rotary inertia device being in fluid communication with the fluid-pressure operated brake-actuating mechanisms 3 through suitable conduits 4, 5. The rotatable housing 6 of the rotary inertia device 1 has a peripheral solid tyre 7 of rubber or the like and is adapted to engage, and be rotated by, the rim 8 of an aircraft wheel 9. This arrangement and the manner of operation of the rotary inertia device is particularly described in the afore-mentioned prior Patent No. 2,656,017.

To eliminate the necessity for constant adjustment of the housing 6 of the rotary inertia device 1 on the torque plate 2 to allow for wear on the tyre 7, the mechanism is pivoted at one end to the torque plate and at its other end is spring-loaded so that the tyre 7 is constantly resiliently-urged into friction-driving contact with the rim 8 as is now to be described. The pivoted end is the trailing end in relation to the normal rotation of the wheel 9, so that it will be appreciated that the arrangement for a left hand wheel will be a mirror image of the arrangement for a right hand wheel. In the drawings and the present description the mounting for a left hand wheel is to be described, the wheel 9 rotating in the direction shown by the arrow A, and the arrow B showing the rotation of the tyre 7 and the housing 6. The direction in which the vehicle or aircraft is moving is shown by the arrow C.

The casing 10 of the rotary inertia device 1 is formed on the end thereof remote from the rim 8 with a flat substantially-rectangular base portion 11 (Figures 1 and 3) which is adapted to lie adjacent a complementary surface 12 formed on the torque plate 2 to which said device 1 is pivotally secured at one end 13 thereof.

Each end of the base 11 is formed with two parallel lugs 14, 15 (Figures 3, 4 and 5) which extend parallel with the front and rear planes of the casing 10. Each lug 14, 15 has a hole 16 extending therethrough (Figures 4 and 5), the holes 16 in each pair of lugs 14 or 15 being provided with bushes 17, 18. Located between the parallel lugs 14 (Figure 5) is a pivot block 19 comprising two co-axial cylindrical bosses 20 rotatably located in the bushes 17 and a central portion 21 fitting in the space between the parallel lugs 14. Similarly, located between the lugs 15 (Figure 4) is a pivot block 22 comprising two coaxial cylindrical bosses 23 rotatably located in the bushes 18 and a central portion 24 fitting in the space between the lugs 15.

The central portion 21 of the pivot block 19 (Figure 5) has a hole 25 formed therethrough at right angles to the bosses 20, and an inwardly-directed annular flange 26 is provided at the outer end thereof. The central portion 24 of the pivot block 22 (Figure 4) has a similar hole 27 formed therethrough and a similar inwardly-directed annular flange 28 is provided at the outer end thereof.

Although both ends of the base 11 may be spring-loaded to urge the tyre 7 against the rim 8, it is not essential that this should be so, and in the present instance only one end of the base 11 is spring-loaded, the other end being pivoted by the pilot block 19 to enable the base to swing under the action of the spring as described hereunder.

Accordingly a screw-threaded bolt 29 (Figure 5) is passed through the hole 25 in the pivot block 19, its head engaging the outside of the flange 26 through an interposed plate washer 30. The pivot blocks 19 and 22 are interchangeable, and a packing bush 31 is inserted in the hole 25 to provide a rigid pivotal support for the bolt 29 in the annular chamber which accommodates the spring in the block 22, as is now to be described.

Through the hole 27 in the pivot block 22 (Figure 4) is passed a stud 32 having one of its ends screw-threaded and being provided intermediate its ends with an annular flange 33, said flange being nearer the screw-threaded end of the stud than the other end. Prior to the insertion of the stud 32 in the hole 27, a helical compression spring 34 is threaded on the longer, plain, end of the stud, and this spring 34 is then placed under compression between the flange 28 of the pivot block 22 and the flange 33 of the stud 32. A plate washer 35 is passed over the plain end of the stud 32, and is held in place by a spring clip 36 engaged in an annular grove 37 in the free end of the stud.

The bolt 29 and stud 32 are screwed into suitable holes formed in the edge 12 of the torque member 2 and the tyre 7 is engaged with the rim 8, the size and rating of the spring 34 being such that when the tyre 7 and rim 8 are engaged, the spring 34 is under a predetermined compression and an annular space 40 (Figure 4) is developed between the washer 35 and the outer face of the flange 28 to provide "follow-up" for the spring 34 to maintain the tyre 7 and rim 8 in efficient contact as wear of the tyre takes place.

The device is preferably so located on the torque member that the spring-urged end of the base 11 is radially closer to the centre of the wheel than the pivoted end 13, thus to eliminate any tendency of the tyre 7 to jam on the rim 8. To provide a positive contact between the tyre and the rim and prevent any tendency of rapid acceleration of the wheel to cause the tyre 7 to bounce clear of the rim 8, the sprung end of the base 11 is the leading edge of the device in the normal direction of rotation of the wheel.

Besides allowing constant automatic adjustment of the contact between the tyre 7 and the rim 8 to compensate for operational wear, the resilient relationship between the tyre and rim also prevents uneven wearing of the tyre 7 due to the rapid series of sudden accelerations and decelerations to which the device is subjected during the normal landing run of an aircraft, the spring-loading of the tyre 7 against the rim 8 permitting a slight deflection of the spring 34 on each sudden acceleration or deceleration and thus preventing this uneven wear. This deflection, however, is insufficient to bounce the tyre clear of the rim.

Whilst the invention has been described with specific reference to its relation to a rotary inertia device of the type disclosed in Patent No. 2,656,017, it is equally applicable to any type of rotary inertia mechanism actuated by the frictional contact between two rotating parts and its is not intended that the scope of the invention should be limited to its application to the precise rotary inertia mechanism described, such description being for the purpose of illustration, only. The invention is equally applicable to aircraft wheel brakes and vehicle brakes.

Having now described my invention, what I claim is:

1. A mounting for a rotary inertia brake control device comprising a tire to be driven by a wheel, a non-rotatable casing mounting said tire, a fixed support and means securing said casing to said support and comprising a spring biasing said casing in a direction to press said tire against a rotating surface of a wheel and wherein said casing has a pair of lugs extending from each end thereof, pivot blocks rotatable in co-axial eyes in each said pair of lugs and means passing through each pivot block at right angles to the axis of said co-axial holes for securing said base to said fixed support, at least one of said securing means including said spring whereby to urge said casing away from said fixed support.

2. The mounting of claim 1 wherein each said pivot block comprises a substantially rectangular portion adapted to be received in the space between a pair of said lugs, two co-axial trunnions extending one on each opposite side of said rectangular portion and adapted to be received in respective eyes in said parallel lugs, said rectangular portion having a passage at right angles to the axis of said trunnions and an inturned annular flange at one end of said passage and in which said means for securing said base to said fixed support comprises a bolt passing through each said passage and secured to said fixed support, and wherein said spring is a helical spring in compression in said passage of one pivot block between said annular flange and an annular flange formed on said bolt whereby said end of said casing is resiliently secured to said fixed support.

3. The mounting of claim 2 having an annular bush of the same radial thickness as said annular flange in said passage having said spring is received in the passage of the other of said pivot blocks to secure said end of said casing pivotally but non-resiliently to said fixed support, said pivot blocks thus being interchangeable between said ends.

4. The mounting of claim 1 wherein the spring-urged end of said casing is at the leading end thereof relative to the normal rotational direction of a wheel.

5. The mounting of claim 1 wherein the spring-urged end of said casing is radially closer to the center of the wheel than the other end thereof.

6. A mounting for a rotary inertia valve controlling device comprising a base having a pair of parallel lugs extending from each end thereof and having aligned eyes, a pivot block secured in said eyes in each pair of lugs and means extending at right angles to the axis of said eyes and through each pivot block to pivotally secure said base to a non-rotatable portion of a brake and wherein at least one of said means to pivotally secure said base to said non-rotatable portion of a brake comprises a spring means to force said base away from said non-rotatable portion of the brake.

References Cited in the file of this patent

UNITED STATES PATENTS

| | | |
|---|---|---|
| 1,095,989 | Scholes | May 5, 1914 |
| 1,284,389 | Lovelace | Nov. 12, 1918 |
| 1,610,755 | Decker | Dec. 14, 1926 |
| 1,842,608 | Hiatt | Jan. 26, 1932 |
| 1,913,456 | Roedding | June 13, 1933 |
| 2,235,972 | Zimmerman | Mar. 25, 1941 |
| 2,377,284 | Welden | May 29, 1945 |
| 2,656,017 | Trevaskis | Oct. 20, 1953 |
| 2,776,027 | Pendlebury | Jan. 1, 1957 |